(12) United States Patent
Ren et al.

(10) Patent No.: US 10,731,505 B2
(45) Date of Patent: Aug. 4, 2020

(54) SYSTEM FOR SENSING SHIFTING OF DRIVE RING, COMPRESSOR AND GAS TURBINE

(71) Applicant: Siemens Aktiengesellschaft, Munich (DE)

(72) Inventors: Chao Ren, Shanghai (CN); Biao Sun, Shanghai (CN); Danning You, Shanghai (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 276 days.

(21) Appl. No.: 15/763,498

(22) PCT Filed: Oct. 27, 2016

(86) PCT No.: PCT/EP2016/075978
§ 371 (c)(1),
(2) Date: Mar. 27, 2018

(87) PCT Pub. No.: WO2017/072254
PCT Pub. Date: May 4, 2017

(65) Prior Publication Data
US 2018/0283201 A1 Oct. 4, 2018

(30) Foreign Application Priority Data
Oct. 30, 2015 (CN) .......................... 2015 1 0728962

(51) Int. Cl.
*F01D 21/00* (2006.01)
*F01D 17/16* (2006.01)
*G01B 21/16* (2006.01)

(52) U.S. Cl.
CPC ......... *F01D 21/003* (2013.01); *F01D 17/162* (2013.01); *G01B 21/16* (2013.01);
(Continued)

(58) Field of Classification Search
CPC ..... F01D 21/003; F01D 17/162; G01B 21/16; F05D 2220/3216; F05D 2220/32; F05D 2260/80
See application file for complete search history.

(56) References Cited

U.S. PATENT DOCUMENTS

| 6,717,418 B2 * | 4/2004 | Orenstein ............... F01D 21/04 324/644 |
| 7,927,067 B2 * | 4/2011 | Rajamani ............... F01D 17/02 415/118 |

(Continued)

OTHER PUBLICATIONS

Notification of Transmittal of the International Search Report and the Written Opinion of the International Searching Authority, or the Declaration for PCT/EP2016/075978 Filed Oct. 27, 2016.
(Continued)

*Primary Examiner* — Aaron R Eastman
*Assistant Examiner* — Adam W Brown
(74) *Attorney, Agent, or Firm* — Harness, Dickey & Pierce, P.L.C.

(57) ABSTRACT

A system is for sensing a shifting of a drive ring, a compressor, and a gas turbine. The system includes a compressor housing; at least one drive ring installable on the compressor housing and disposed on the compressor housing with a spacing, and the at least one drive ring being provided with at least one installation hole, extending along a radial direction of the at least one drive ring; and at least one sensor, located in the corresponding installation hole and used to sense the spacing between the at least one drive ring and the compressor housing in real time. In an embodiment, the system for sensing a shifting of a drive ring, the compressor, and the gas turbine has advantages of simple structures and relatively low costs.

20 Claims, 5 Drawing Sheets

(52) U.S. Cl.
CPC .. *F05D 2220/32* (2013.01); *F05D 2220/3216* (2013.01); *F05D 2260/80* (2013.01)

(56) References Cited

U.S. PATENT DOCUMENTS

| | | | | |
|---|---|---|---|---|
| 8,123,472 | B2* | 2/2012 | Redgwell | F01D 17/162 |
| | | | | 415/155 |
| 8,230,726 | B2* | 7/2012 | Hafner | F01D 11/20 |
| | | | | 73/112.01 |
| 8,668,444 | B2* | 3/2014 | Jarrett, Jr. | F01D 17/162 |
| | | | | 415/160 |
| 9,567,873 | B2* | 2/2017 | Ueda | F01D 25/162 |
| 9,732,624 | B2* | 8/2017 | Singh | F01D 9/02 |
| 9,970,315 | B2* | 5/2018 | DiVincenzo | F01D 17/02 |
| 2005/0147492 | A1 | 7/2005 | Mahoney et al. | |
| 2009/0162192 | A1 | 6/2009 | McCaffrey | |
| 2012/0076641 | A1 | 3/2012 | Jarrett, Jr. et al. | |

OTHER PUBLICATIONS

Chinese Office Action dated Apr. 2, 2019.

* cited by examiner

SYSTEM FOR SENSING SHIFTING OF DRIVE RING, COMPRESSOR AND GAS TURBINE

PRIORITY STATEMENT

This application is the national phase under 35 U.S.C. § 371 of PCT International Application No. PCT/EP2016/075978 which has an International filing date of Oct. 27, 2016, which designated the United States of America and which claims priority to Chinese patent application number CN 201510728962.3 filed Oct. 30, 2015, the entire contents of which are hereby incorporated herein by reference.

FIELD

An embodiment of the present invention generally relates to the field of energy technology, and in particular to a system for sensing a shifting of a drive ring, a compressor and a gas turbine.

BACKGROUND

A gas turbine is a rotary power machinery, which converts heat energy into mechanical work with continuous flow of a gas as the working fluid. The gas turbine generally consists of three parts: a compressor, a combustor and a turbine.

When in operation, the compressor intakes air from the outside atmosphere, the air is pressurized by compressing stage by stage via an axial-flow compressor, and the air temperature is correspondingly increased; the compressed air is delivered to the combustor under pressure, and mixed with the injected fuel for combustion to generate a high-temperature and high-pressure gas; and then the high-temperature and high-pressure gas further enters the turbine to expand to do work, so as to push the turbine to drive the compressor to perform high-speed rotation together with an external load rotor, so as to convert the chemical energy of the gas or liquid chemical fuel into mechanical work and output electric work.

The compressor is a key component of the gas turbine, and in general, the compressor is an axial-flow compressor, and the operation state of the gas turbine compressor changes, so that the flow state of the air in the compressor changes. In order to make the compressor adapt to different operating states of the gas turbine, it is necessary to arrange guide vanes in the compressor. The flow state of the air entering the compressor is changed by changing the angle of attack of the guide vanes. The compressor is generally provided with continuously arranged multiple stages of guide vane groups, and each stage of the guide vane groups is provided with a plurality of guide vanes, and is driven by a drive mechanism corresponding to this stage of the guide vane groups.

The drive mechanism generally comprises a drive ring, wherein the drive ring is installed on a compressor housing, the drive ring needs to be arranged coaxially with the compressor housing, and if the drive ring deviates from the central axis of the compressor housing, the guide vanes in the same stage will be in different deflection angles, which may seriously affect the performance of the compressor.

Therefore, during the installation and operation of the gas turbine, it is necessary to measure the amount of shifting of the drive ring, so as to conveniently adjust the location of the drive ring. When installed, the amount of shifting of the drive ring may be measured using calipers, for example, eight fulcrums are provided between the drive ring and the compressor housing, the spacings between the drive ring and the compressor housing at the eight fulcrums are measured using the calipers, so as to calculate and determine whether the location of the drive ring is correct; however, during the operation of the gas turbine, such measurement cannot measure the amount of shifting of the drive ring.

FIG. 1 is a structural schematic view of a system for sensing a shifting of a drive ring in the prior art. Referring to FIG. 1, a system 100 for sensing a shifting of a drive ring comprises a drive ring 12, a compressor housing 13 and a sensing mechanism 14. The drive ring 12 is installed on the compressor housing 13. The sensing mechanism 14 is of a cantilever structure, which comprises fasteners 142, a connecting lever 143 and a sensor 144, wherein the number of fasteners 142 is two, and the two fasteners 142 pass through the connecting lever 143 and are locked onto the compressor housing 13, so that one end of the connecting lever 143 is installed on the compressor housing 13, and the sensor 144 is disposed at the other end of the connecting lever 143.

The sensor 144 is a contact type sensor, which has one end abutted against the drive ring 12, and the other end thereof abutted against the compressor housing 13. The spacing between an inner wall of the drive ring 12 and the central axis of the compressor housing 13 may be sensed by the sensor 144, so as to determine whether the drive ring 12 shifts.

However, the sensing mechanism 14 has many elements, each element has a dimensional tolerance, and the superposition of dimensional tolerances will affect the sensing accuracy of the sensing mechanism 14. In addition, the sensing mechanism is complex in installation and high in costs.

SUMMARY

At least one embodiment of the present invention provides a system for sensing a shifting of a drive ring, which has the advantages of a high sensing accuracy, a simple structure and relatively low costs.

At least one embodiment of the present invention provides a compressor, which has the advantages of a better working performance, a simple structure and relatively low costs.

At least one embodiment of the present invention provides a gas turbine, which has the advantages of a better working performance, a high power generation efficiency, simple structure and relatively low costs.

At least one embodiment of the present invention provides a system for sensing a shifting of a drive ring, comprising: a compressor housing; at least one drive ring, wherein the drive ring is installable on the compressor housing, and is disposed on the compressor housing with a spacing, and the drive ring is provided with at least one installation hole, wherein the installation hole extends along a radial direction of the drive ring; and at least one sensor, wherein the sensor is configured to be located in the corresponding installation hole, and is used to sense the spacing between the drive ring and the compressor housing in real time.

At least one embodiment of the present invention further proposes a compressor, comprising: a compressor housing; at least one drive ring, wherein the drive ring is installed on the compressor housing and is disposed on the compressor housing with a spacing, and the drive ring is provided with at least one installation hole, wherein the installation hole extends along a radial direction of the drive ring; a plurality of guide vanes, wherein the guide vane is disposed in the compressor housing and is driven by the corresponding drive ring to rotate; and at least one sensor, wherein the sensor is disposed in the corresponding installation hole and is used to sense the spacing between the drive ring and the compressor housing in real time.

At least one embodiment of the present invention further proposes a gas turbine, wherein the gas turbine comprises any one of the embodiments of the above-mentioned compressors.

BRIEF DESCRIPTION OF THE DRAWINGS

The above-mentioned and other features and advantages of the present invention will become more apparent to a person skilled in the art from the following detailed description of preferred embodiments of the present invention with reference to the accompanying drawings, wherein.

DETAILED DESCRIPTION OF THE EXAMPLE EMBODIMENTS

Figure 1:
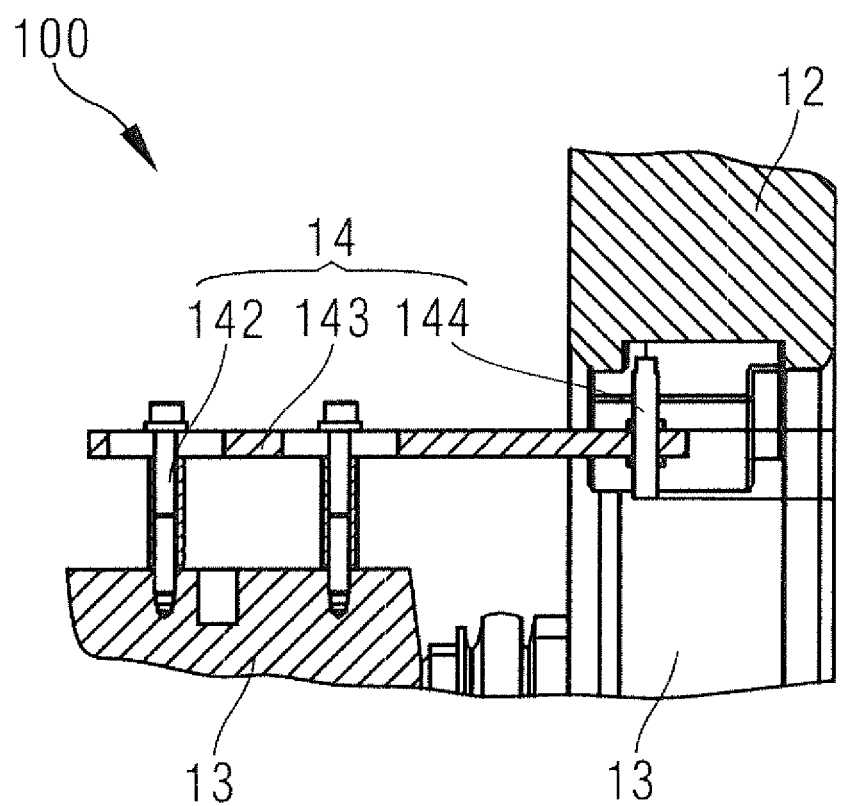
FIG. 1 is a structural schematic view of a system for sensing a shifting of a drive ring in the prior art.

At least one embodiment of the present invention provides a system for sensing a shifting of a drive ring, comprising: a compressor housing; at least one drive ring, wherein the drive ring is installable on the compressor housing, and is disposed on the compressor housing with a spacing, and the drive ring is provided with at least one installation hole, wherein the installation hole extends along a radial direction of the drive ring; and at least one sensor, wherein the sensor is configured to be located in the corresponding installation hole, and is used to sense the spacing between the drive ring and the compressor housing in real time.

In an example embodiment of the system for sensing a shifting of a drive ring, the compressor housing has an outer surface, and the sensor faces the outer surface.

In an example embodiment of the system for sensing a shifting of a drive ring, a part of the outer surface directly facing the sensor is an arc surface or a flat surface.

At least one embodiment of the present invention further proposes a compressor, comprising: a compressor housing; at least one drive ring, wherein the drive ring is installed on the compressor housing and is disposed on the compressor housing with a spacing, and the drive ring is provided with at least one installation hole, wherein the installation hole extends along a radial direction of the drive ring; a plurality of guide vanes, wherein the guide vane is disposed in the compressor housing and is driven by the corresponding drive ring to rotate; and at least one sensor, wherein the sensor is disposed in the corresponding installation hole and is used to sense the spacing between the drive ring and the compressor housing in real time.

In an example embodiment of the compressor, the sensor is a photoelectric sensor, an electromagnetic sensor or an ultrasonic sensor.

In an example embodiment of the compressor, the compressor further comprises a plurality of linkage mechanisms, and each linkage mechanism is connected between the corresponding drive ring and the corresponding guide vane.

In an example embodiment of the compressor, each linkage mechanism comprises: a guide vane connecting lever, disposed beside the drive ring; and an adjustment lever, disposed beside the drive ring, wherein the adjustment lever is connected between the corresponding guide vane connecting lever and the drive ring, so as to transfer power of the drive ring to the guide vane connecting lever.

In an example embodiment of the compressor, the compressor further comprises a control processor, wherein the control processor is electrically connected to the sensor, and is used to receive information sensed by the sensor and process the information sensed by the sensor, so as to determine whether the drive ring shifts.

At least one embodiment of the present invention further proposes a gas turbine, wherein the gas turbine comprises any one of the embodiments of the above-mentioned compressors.

It can be seen from the above-mentioned technical solutions that, in the system for sensing a shifting of a drive ring, the compressor and the gas turbine of the present invention, the sensor is directly disposed in the installation hole of the drive ring, so as to achieve the real-time sensing of the spacing between the drive ring and the compressor housing, to provide sensing data for determining whether the drive ring shifts; and since the sensor does not need complex auxiliary installation elements, the system for sensing a shifting of a drive ring, the compressor and the gas turbine of the present invention have simple structures and relatively low costs. Furthermore, the sensor is simple in installation, and the sensing accuracy will not be affected due to the superposition of tolerances of the auxiliary installation elements; therefore, the system for sensing a shifting of a drive ring of the present invention has a better sensing accuracy, so that the compressor and the gas turbine have a better working performance, and the gas turbine has a relatively high power generation efficiency.

In order to make the object, technical solution, and advantages of the present invention more apparent, the present invention will be described in further detail by way of example hereinafter.

Figure 2:
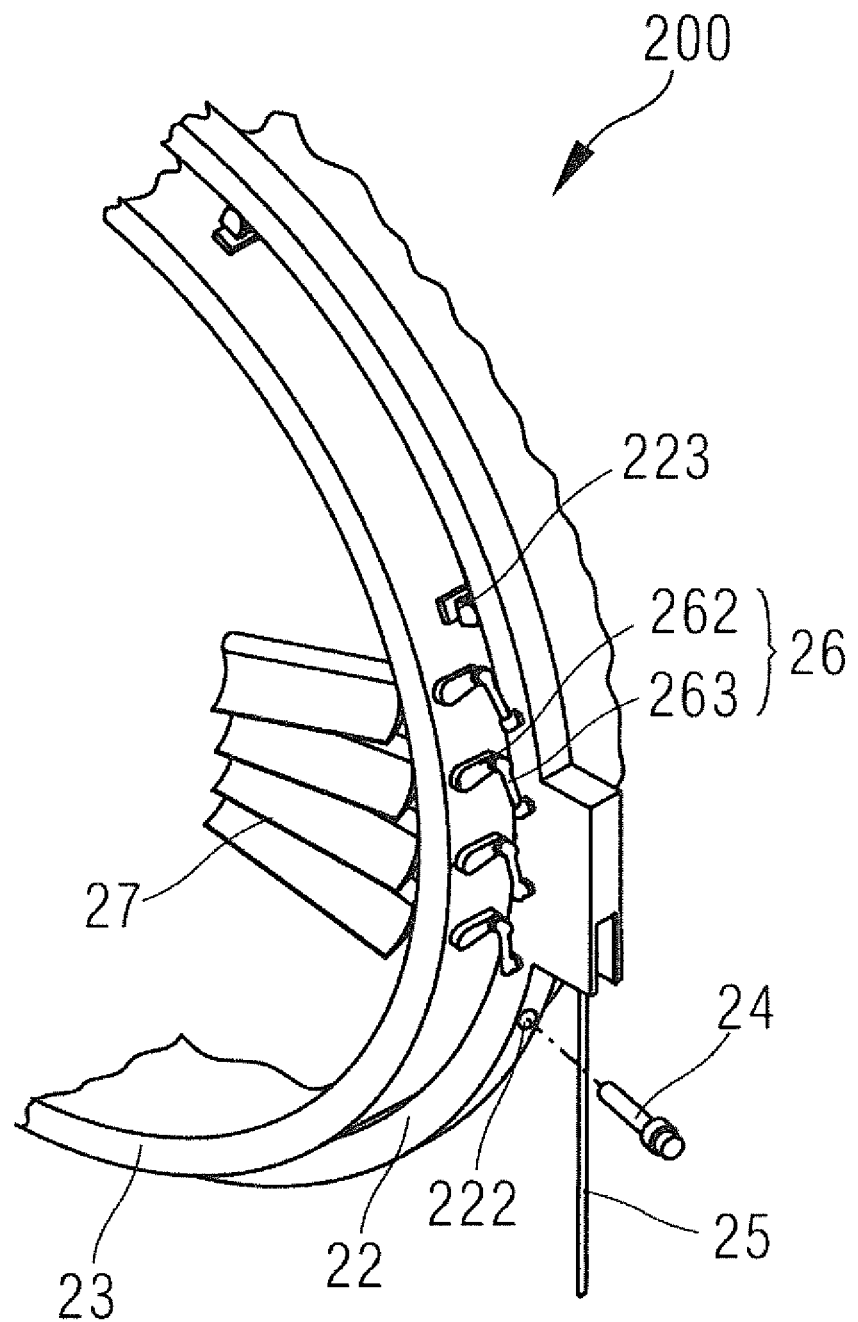
FIG. 2 is a schematic structural view of a compressor of an embodiment of the present invention.
Figure 3:
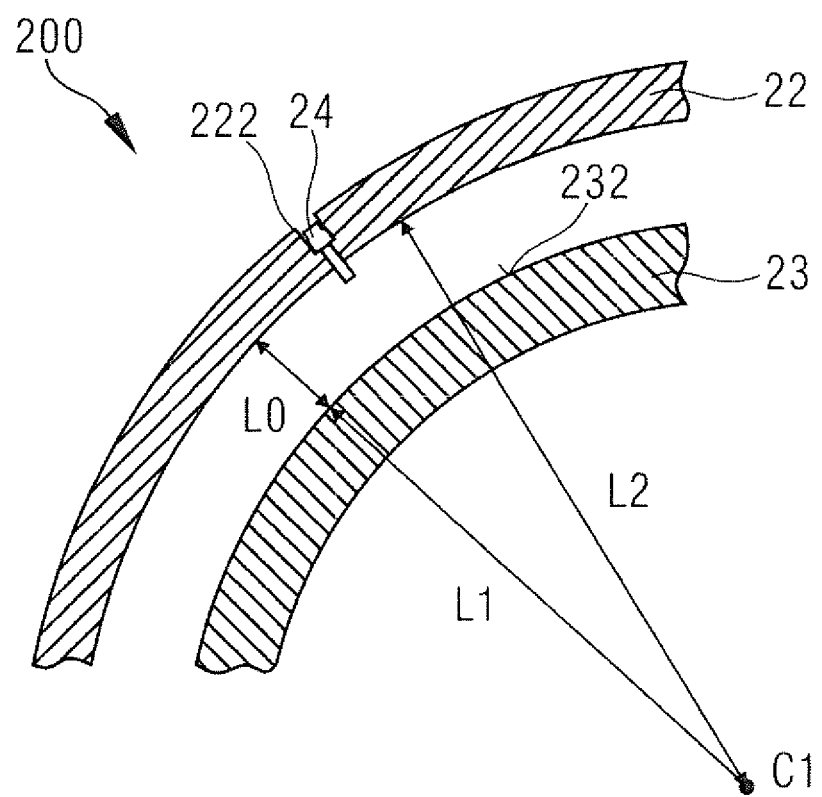
FIG. 3 is a schematic sectional view of the system for sensing a shifting of a drive ring of the compressor as shown in FIG. 2.

FIG. 2 is a schematic structural view of a compressor of an embodiment of the present invention. FIG. 3 is a schematic sectional view of the system for sensing a shifting of a drive ring of the compressor as shown in FIG. 2.

Referring to FIGS. 2 and 3, a compressor in this embodiment comprises a system 200 for sensing a shifting of a drive ring, at least one push lever 25, a plurality of linkage mechanisms 26 and a plurality of guide vanes 27. The system 200 for sensing a shifting of a drive ring comprises at least one drive ring 22, a compressor housing 23 and at least one sensor 24, wherein the drive ring 22 may be installed on the compressor housing 23, and is disposed on the compressor housing 23 with a spacing, i.e., the drive ring 22 is sleeved on the compressor housing 23, and when the drive ring 22 is located in a standard position, the drive ring 22 is coaxial with the compressor housing 23.

The drive ring 22 is provided with at least one installation hole 222, and the installation hole 222 extends along a radial direction of the drive ring 22. The sensor 24 may be disposed in the corresponding installation hole 222, and is used to sense the spacing between the drive ring 22 and the compressor housing 23 in real time.

More particularly, the at least one drive ring 22 may be four in number, each drive ring 22 is used to adjust the angle of attack of one stage of guide vanes 27, i.e., four drive rings 22 may adjust the angles of attack of four stages of guide vanes 27, and the number of drive rings 22 is not limited hereby, and in other embodiments, the number of drive rings 22 may be set arbitrarily as claimed in the practical requirements. The inner diameter of the drive ring 22 is greater than the outer diameter of the compressor housing 23, the drive ring 22 is installed on the outer side of the compressor housing 23 via a plurality of bases 223, and under the standard working conditions, the drive ring 22 is arranged coaxially with the compressor housing 23 with a spacing.

As shown in FIG. 3, the center of a circle of cross section of the drive ring 22 and the center of a circle of cross section of the compressor housing 23 are both CI. The bases 223 are uniformly distributed along the outer periphery of the compressor housing 23, and are used to support the drive ring 22, and the number of bases 223 is eight, for example, but not limited hereby. The installation hole 222 is a stepped through-hole, and the end thereof close to the compressor housing 23 has a relatively small aperture. The compressor housing 23 is a compressor inlet casing (CIC) or a casing vane carrier (CVC), for example. The compressor housing 23 has an outer surface 232, and the sensor 24 faces the outer surface 232. In this embodiment, a part of the outer surface 232 directly facing the sensor 24 is an arc surface, i.e., the entire outer surface 232 is a circular arc surface.

The sensor 24 may be a photoelectric sensor, an electromagnetic sensor or an ultrasonic sensor, but not limited hereby. The sensor 24 is used to sense the spacing between an inner side wall of the drive ring 22 and the outer surface 232 of the compressor housing 23. When the sensor 24 is a photoelectric sensor, it may comprise a transmitter, a receiver and a detection circuitry. In this embodiment, the diameter of one end of the sensor 24 is greater than that of the other end thereof, and the sensor 24 is disposed in the installation hole 222, with one end thereof passing through the installation hole 222, i.e., one end of the sensor 24 protrudes out of the installation hole 222, but not limited hereby. In other embodiments, the length of the sensor 24 may be set to be shorter, i.e., with the length just allowing a sensing signal from the sensor 24 to reach the outer surface 232 of the compressor housing 23.

It should be noted that the number of sensors 24 may be multiple, for example, four, but not limited hereby, and the four sensors 24 are uniformly distributed on the drive ring 22. The installation hole 222 on the drive ring 22 may be a through-hole, or a blind hole with an opening facing the compressor housing 23, and the sensor 24 may protrude out of the installation hole 222, or may be completely located in the installation hole 222, which can be arbitrarily set as claimed in the practical requirements. The number of the at least one push lever 25 may correspond to the number of drive rings 22, and when the number of drive rings 22 is four, the number of push levers 25 is also four, and the push levers 25 are connected to the corresponding drive rings 22 to drive the drive ring 22 to rotate.

The number of linkage mechanisms 26 may be set as claimed in the practical requirements, and each drive ring 22 may correspond to a plurality of linkage mechanisms 26, i.e., one drive ring 22 may be connected to a plurality of linkage mechanisms 26. Each linkage mechanism 26 is connected between the corresponding drive ring 22 and the corresponding guide vane 27, and comprises a guide vane connecting lever 262 and an adjustment lever 263. The guide vane connecting lever 262 is disposed beside the drive ring 22. The adjustment lever 263 is disposed beside the drive ring 22, and the adjustment lever 263 is connected between the corresponding guide vane connecting lever 262 and the drive ring 22, so as to transfer power of the drive ring 22 to the guide vane connecting lever 262. The structure of the linkage mechanism 26 is not limited by this embodiment, and other structures that are different therefrom and able to transfer the power of the drive ring 22 to the linkage mechanism 26 of the guide vane 27 may also be applied to embodiments of the present invention.

The number of guide vanes 27 corresponds to the number of linkage mechanisms 26, the guide vane 27 is a stationary vane of the compressor, and is disposed in the compressor housing 23, the guide vane connecting lever 262 of the linkage mechanism 26 is connected between the guide vane 27 and the drive ring 22, and the guide vane 27 may be driven by the corresponding drive ring 22 to rotate, so as to adjust the angle of attack of the guide vane 27.

Figure 4:
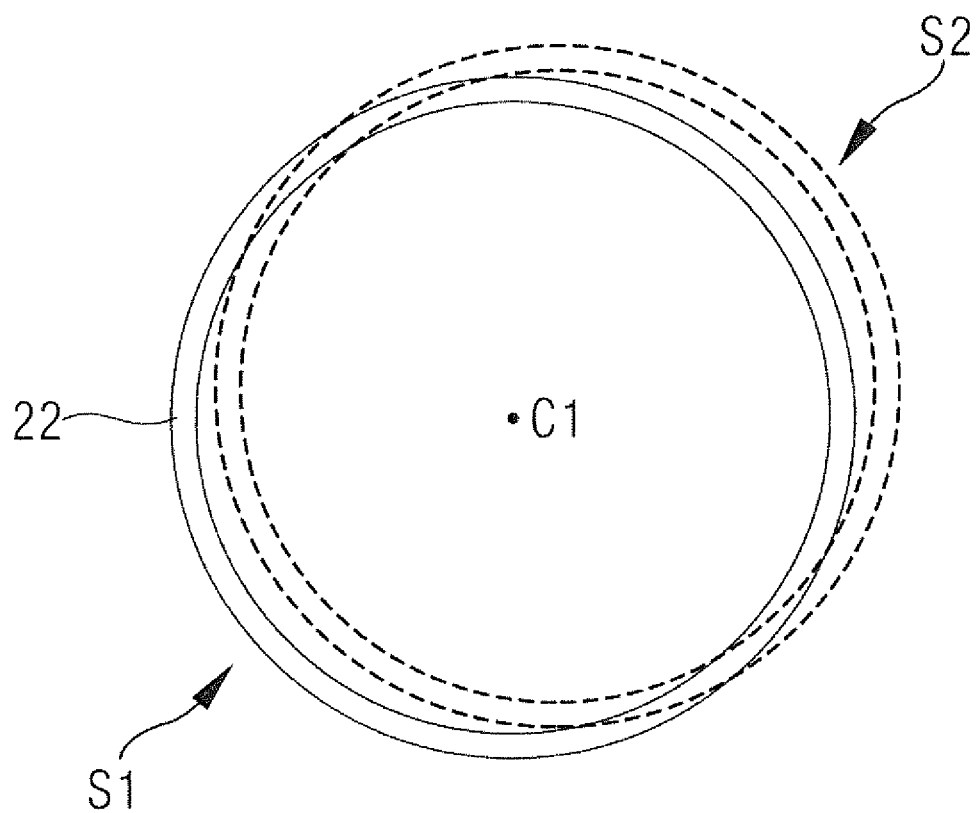
FIG. 4 is a schematic view showing that the location of the drive ring of the compressor as shown in FIG. 2 shifts.

During the installation and operation of the compressor, the spacing between the drive ring 22 and the compressor housing 23 may be sensed by the sensor 24, and whether the drive ring 22 is arranged coaxially with the compressor housing 23 can be determined as claimed in the sensed result. Referring to FIG. 4, the center of a circle of cross section of the compressor housing 23 is CI, and when the drive ring 22 is located in a position SI, the center of a circle of cross section of the drive ring 22 is also CI, and the drive ring 22 is located in the standard position and does not shift. When the drive ring 22 moves to a position S2, the drive ring 22 shifts, the rotation angles of the guide vanes 27 driven by the drive ring 22 will be inconsistent, the performance of the compressor will be affected, and in turn the working efficiency and performance of the gas turbine may be seriously affected. When the drive ring 22 shifts, the position of the drive ring 22 may be slightly adjusted by a control signal, or the position of the drive ring 22 may be adjusted in a shutdown state.

It should be noted that the system 200 for sensing a shifting of a drive ring of this embodiment may further comprise a control processor (not shown), wherein the control processor is electrically connected to the sensor 24, and is used to receive information sensed by the sensor 24 and process the information sensed by the sensor 24, so as to determine whether the drive ring 22 shifts, as shown in FIG. 3, the sensor 24 senses that the distance between the drive ring 22 and the compressor housing 23 is L0, the control processor stores a standard value of a distance LI between the outer surface 232 and the center of a circle CI of the compressor housing 23 and a standard value of a distance L2 between the inner side wall of the drive ring 22 and the center of a circle CI, and the control processor calculates and processes the distance L0 and the distance LI to obtain an actual value of the distance L2 between the inner side wall of the drive ring 22 and the center of a circle CI, and then compares the actual value of the distance L2 with the standard value of the distance L2, so as to determine whether the drive ring 22 shifts. A threshold of the amount of shifting may be set by the control processor; if the drive ring 22 shifts, the amount of shifting is relatively small, and the amount of shifting is less than or equal to the threshold of the amount of shifting, the control processor sends a control signal to slightly adjust the position of the drive ring 22, such that the drive ring 22 is coaxial with the compressor housing 23; and if the amount of shifting is relatively large, and the amount of shifting is greater than the threshold of the amount of shifting, the control processor sends an alarm to remind the operator to shut down to adjust the position of the drive ring 22.

Figure 5:
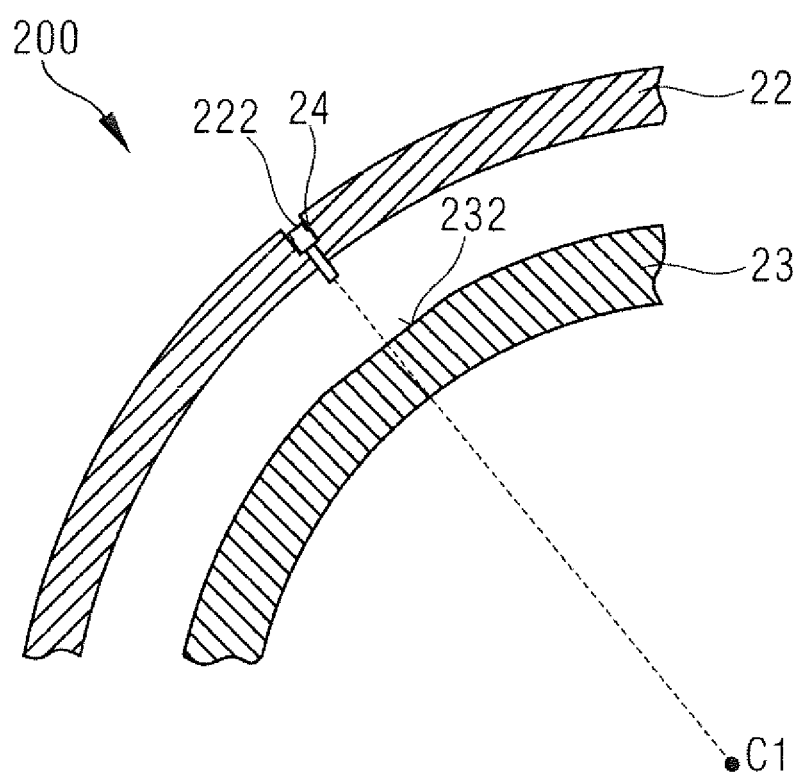
FIG. 5 is a schematic sectional view of the system for sensing a shifting of a drive ring of a compressor of another embodiment of the present invention.

FIG. 5 is a schematic sectional view of the system for sensing a shifting of a drive ring of a compressor of another embodiment of the present invention. The system 200 for sensing a shifting of a drive ring of this embodiment is similar to the system 200 for sensing a shifting of a drive ring as shown in FIG. 3, except that the part of the outer surface 232 of the compressor housing 23 directly facing the sensor 24 is a flat surface. Since the part 24 of the outer surface 232 of the compressor housing 23 directly facing the sensor is a flat surface, the sensing signal of the sensor 24 is reflected by the flat surface, which can achieve a better sensing accuracy.

At least one embodiment of the present invention further provides a gas turbine, which comprises the above-mentioned compressor, and since the compressor comprises a system for sensing a shifting of a drive ring 20, it is possible to sense whether the drive ring 22 shifts in real time, so as to facilitate the adjustment of the position of the drive ring 22, so that the rotation angles of the plurality of guide vanes 27 keep consistent, and the flow state of the air entering the compressor keeps consistent with the pre-set state, so as to effectively improve the performance and power generation efficiency of the gas turbine. The structure and working principle of the system for sensing a shifting of a drive ring 20 will not be repeatedly described herein.

The gas turbine and the system for sensing a shifting of a drive ring of the present invention at least have advantages as follows:

1. In the system for sensing a shifting of a drive ring, the compressor and the gas turbine of an embodiment of the present invention, the sensor is directly disposed in the installation hole of the drive ring, so as to achieve the real-time sensing of the spacing between the drive ring and the compressor housing, to provide sensing data for determining whether the drive ring shifts; and since the sensor does not need complex auxiliary installation elements, the system for sensing a shifting of a drive ring, the compressor and the gas turbine of the present invention have simple structures and relatively low costs. Furthermore, the sensor is simple in installation, and the sensing accuracy will not be affected due to the superposition of tolerances of the auxiliary installation elements; therefore, the system for sensing a shifting of a drive ring of the present invention has a better sensing accuracy, so that the compressor and the gas turbine have a better working performance, and the gas turbine has a relatively high power generation efficiency.

2. In an embodiment of the system for sensing a shifting of a drive ring, the compressor and the gas turbine of the present invention, the part, directly facing the sensor, of the outer surface of the compressor housing is a flat surface, and the sensing signal of the sensor is reflected by the flat surface, so as to achieve a better sensing accuracy.

3. In an embodiment of the system for sensing a shifting of a drive ring, the compressor and the gas turbine of the present invention, the number of sensors is multiple, a plurality of sensors are uniformly distributed on the drive ring, and the plurality of sensors perform sensing simultaneously to obtain more accurate sensing data.

4. In an embodiment of the system for sensing a shifting of a drive ring, the compressor and the gas turbine of the present invention, the installation hole on the drive ring may be a through-hole, or may be a blind hole with an opening facing the compressor housing, and the sensor may protrude out of the installation hole, or may be completely located in the installation hole, so as to be applied conveniently and flexibly.

5. In an embodiment of the system for sensing a shifting of a drive ring, the compressor and the gas turbine of the present invention, the sensor may be a photoelectric sensor, an electromagnetic sensor or an ultrasonic sensor, which may be set as claimed in the actual situations.

The above description is only preferred embodiments of the invention, not intended to limit the present invention, any modifications equivalent replacements, or improvements made within the spirit and principles of the present invention should be included within the scope of protection of the present invention.

REFERENCE NUMERALS

100 System for sensing a shifting of a drive ring
12 Drive ring
13 Compressor housing
14 Sensing mechanism
42 Fastener
143 Connecting lever
144 Sensor
200 System for sensing a shifting of a drive ring
22 Drive ring
222 Installation hole
223 Base
23 Compressor housing
232 Outer surface
24 Sensor
25 Push lever
26 Linkage mechanism
262 Guide vane connecting lever
263 Adjustment lever
27 Guide vane
CI Center of a circle
L0, LI, L2 Distance
S1, S2 Location of the drive ring

The invention claimed is:

1. A system for sensing a shifting of a drive ring, comprising:
 a compressor housing;
 at least one drive ring, the at least one drive ring being installable on the compressor housing and disposed on the compressor housing with a spacing, the at least one drive ring including at least one installation hole, the at least one installation hole extending along a radial direction of the at least one drive ring; and
 at least one sensor, the at least one sensor being located in a corresponding one of the at least one installation hole and being usable to sense the spacing between the at least one drive ring and the compressor housing in real time.

2. The system of claim 1, wherein the compressor housing includes an outer surface, the at least one sensor facing the outer surface.

3. The system of claim 2, wherein a part of the outer surface directly facing the at least one sensor is an arc surface or a flat surface.

4. A compressor, comprising:
 a compressor housing;
 at least one drive ring, the at least one drive ring being installed on the compressor housing, and being disposed on the compressor housing with a spacing, and the at least one drive ring being provided with at least one installation hole, the at least one installation hole extending along a radial direction of the at least one drive ring;

a plurality of guide vanes, the plurality of guide vanes being disposed within the compressor housing and each of the plurality of guide vanes being respectively driven by a corresponding one of the at least one drive ring to rotate; and at least one sensor, the at least one sensor being disposed in a corresponding one of the at least one installation hole, and being usable to sense the spacing between the at least one drive ring and the compressor housing in real time.

5. The compressor of claim 4, wherein the compressor housing includes an outer surface, the at least one sensor facing the outer surface and a part of the outer surface directly facing the at least one sensor being an arc surface or a flat surface.

6. The compressor of claim 5, wherein the at least one sensor is at least one of a photoelectric sensor, an electromagnetic sensor, and an ultrasonic sensor.

7. The compressor of claim 5, further comprising a plurality of linkage mechanisms, each of the plurality of linkage mechanisms respectively being connected between a corresponding one of the at least one drive ring and a corresponding one of the plurality of guide vanes.

8. The compressor of claim 7, wherein of the plurality of linkage mechanisms comprises:

a guide vane connecting level, disposed beside the at least one drive ring; and an adjustment level, disposed beside the at least one drive ring, the adjustment level being connected between a corresponding guide vane connecting lever and the at least one drive ring, so as to transfer power of the at least one drive ring to the guide vane connecting lever.

9. The compressor of claim 5, further comprising:

a control processor, electrically connected to the at least one sensor, to receive information sensed by the at least one sensor and to process the information sensed by the at least one sensor, so as to determine any shift occurs in the at least one drive ring.

10. A gas turbine, comprising the compressor of claim 9.

11. The compressor of claim 4, wherein the at least one sensor is at least one of a photoelectric sensor, an electromagnetic sensor, and/or an ultrasonic sensor.

12. The compressor of claim 11, further comprising a plurality of linkage mechanisms, each of the plurality of linkage mechanisms respectively being connected between a corresponding one of the at least one drive ring and a corresponding one of the plurality of guide vanes.

13. The compressor of claim 12, wherein of the plurality of linkage mechanisms comprises:

a guide vane connecting level, disposed beside the at least one drive ring; and an adjustment level, disposed beside the at least one drive ring, the adjustment level being connected between a corresponding guide vane connecting lever and the at least one drive ring, so as to transfer power of the at least one drive ring to the guide vane connecting lever.

14. The compressor of claim 11, further comprising:

a control processor, electrically connected to the at least one sensor, to receive information sensed by the at least one sensor and to process the information sensed by the at least one sensor, so as to determine any shift occurs in the at least one drive ring.

15. A gas turbine, comprising the compressor of claim 11.

16. The compressor of the claim 4, further comprising a plurality of linkage mechanisms, each of the plurality of linkage mechanisms respectively being connected between a corresponding one of the at least one drive ring and a corresponding one of the plurality of guide vanes.

17. The compressor of claim 16, wherein of the plurality of linkage mechanisms comprises:

a guide vane connecting level, disposed beside the at least one drive ring; and an adjustment level, disposed beside the at least one drive ring, the adjustment level being connected between a corresponding guide vane connecting lever and the at least one drive ring, so as to transfer power of the at least one drive ring to the guide vane connecting lever.

18. A gas turbine, comprising the compressor of claim 16.

19. The compressor of claim 4, further comprising:

a control processor, electrically connected to the at least one sensor, to receive information sensed by the at least one sensor and to process the information sensed by the at least one sensor, so as to determine whether any shift occurs in the at least one drive ring.

20. A gas turbine, comprising the compressor of claim 4.

* * * * *